US011746874B2

(12) United States Patent
Ishizuka et al.

(10) Patent No.: US 11,746,874 B2
(45) Date of Patent: Sep. 5, 2023

(54) BENDING MESHING TYPE GEAR DEVICE AND METHOD OF MANUFACTURING BENDING MESHING TYPE GEAR DEVICE

(71) Applicant: SUMITOMO HEAVY INDUSTRIES, LTD., Tokyo (JP)

(72) Inventors: Masayuki Ishizuka, Kanagawa (JP); Hideo Fukumura, Kanagawa (JP); Takashi Maruyama, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 95 days.

(21) Appl. No.: 17/390,004

(22) Filed: Jul. 30, 2021

(65) Prior Publication Data
US 2022/0049761 A1 Feb. 17, 2022

(30) Foreign Application Priority Data

Aug. 12, 2020 (JP) ................................. 2020-136089

(51) Int. Cl.
*F16H 49/00* (2006.01)
(52) U.S. Cl.
CPC .................. *F16H 49/001* (2013.01)
(58) Field of Classification Search
CPC ..... F16H 49/001; F16C 33/64; F16C 2202/04
See application file for complete search history.

(56) References Cited

U.S. PATENT DOCUMENTS

| 2002/0174741 A1* | 11/2002 | Kobayashi | ............ F16H 57/041 |
| | | | 74/640 |
| 2002/0184967 A1* | 12/2002 | Kobayashi | ............ F16H 49/001 |
| | | | 74/640 |
| 2010/0212446 A1* | 8/2010 | Zhang | ................... F16H 49/001 |
| | | | 74/461 |
| 2016/0131188 A1* | 5/2016 | Sato | ...................... C22C 38/001 |
| | | | 428/457 |
| 2021/0071745 A1* | 3/2021 | Maniwa | ................ F16H 49/001 |

FOREIGN PATENT DOCUMENTS

JP 2018-091444 A 6/2018

OTHER PUBLICATIONS

Translation and JP-2018091444-A.*
Translation and JP-2006144889-A.*

* cited by examiner

*Primary Examiner* — Terence Boes
(74) *Attorney, Agent, or Firm* — Michael Best & Friedrich LLP

(57) ABSTRACT

A bending meshing type gear device includes a wave generator, an external gear that is bent and deformed by the wave generator, an internal gear that meshes with the external gear, and a wave generator bearing disposed between the wave generator and the external gear, in which an inner ring rolling surface on which a rolling element of the wave generator bearing rolls includes a hardened layer, and the hardened layer has a characteristic that a surface hardness after operating for a predetermined time is increased compared to a surface hardness before operation.

16 Claims, 4 Drawing Sheets

BENDING MESHING TYPE GEAR DEVICE AND METHOD OF MANUFACTURING BENDING MESHING TYPE GEAR DEVICE

RELATED APPLICATIONS

The content of Japanese Patent Application No. 2020-136089, on the basis of which priority benefits are claimed in an accompanying application data sheet, is in its entirety incorporated herein by reference.

BACKGROUND

Technical Field

Certain embodiments of the present invention relate to a bending meshing type gear device and a method of manufacturing the bending meshing type gear device.

Description of Related Art

The related art discloses a bending meshing type gear device provided with a wave generator, an external gear that is bent and deformed by the wave generator, an internal gear that meshes with the external gear, and a wave generator bearing disposed between the wave generator and the external gear. In the bending meshing type gear device, when the wave generator with a non-circular cross-section is rotated, the external gear is relatively rotated via the wave generator bearing, and the external gear is bent and deformed around the wave generator.

SUMMARY

According to an embodiment of the present invention, there is provided a bending meshing type gear device including a wave generator; an external gear that is bent and deformed by the wave generator; an internal gear that meshes with the external gear; and a wave generator bearing disposed between the wave generator and the external gear, in which an inner ring rolling surface on which a rolling element of the wave generator bearing rolls includes a hardened layer, and the hardened layer has a characteristic that a surface hardness after operating fora predetermined time is increased compared to a surface hardness before operation.

According to another embodiment of the present invention, there is provided a bending meshing type gear device including a wave generator; an external gear that is bent and deformed by the wave generator; an internal gear that meshes with the external gear; and a wave generator bearing disposed between the wave generator and the external gear, in which an inner ring rolling surface on which a rolling element of the wave generator bearing rolls includes a hardened layer, and the hardened layer has a characteristic that a surface hardness of a rolling portion of the inner ring rolling surface with which the rolling element is in contact is increased compared to a surface hardness of a non-rolling portion of the inner ring rolling surface with which the rolling element is not in contact after operating for a predetermined time.

According to still another embodiment of the present invention, there is provided a method of manufacturing a bending meshing type gear device that includes a wave generator, an external gear that is bent and deformed by the wave generator, an internal gear that meshes with the external gear, and a wave generator bearing disposed between the wave generator and the external gear, the method including: a hardening step of applying a hardening process to an inner ring rolling surface on which a rolling element of the wave generator bearing rolls, in which in the hardening step, a process is performed of imparting a characteristic to the inner ring rolling surface that a surface hardness of the inner ring rolling surface after the bending meshing type gear device is operated for a predetermined time is increased compared to a surface hardness of the inner ring rolling surface before operation.

According to still another embodiment of the present invention, there is provided a method of manufacturing a bending meshing type gear device that includes a wave generator, an external gear that is bent and deformed by the wave generator, an internal gear that meshes with the external gear, and a wave generator bearing disposed between the wave generator and the external gear, the method including: a hardening step of applying a hardening process to an inner ring rolling surface on which a rolling element of the wave generator bearing rolls, in which in the hardening step, a process is performed of imparting a characteristic to the inner ring rolling surface that a surface hardness of a rolling portion of the inner ring rolling surface with which the rolling element is in contact is increased compared to a surface hardness of a non-rolling portion of the inner ring rolling surface with which the rolling element is not in contact after the bending meshing type gear device is operated for a predetermined time.

DETAILED DESCRIPTION

In the bending meshing type gear device, an inner ring rolling surface of the wave generator bearing is in a severe condition in terms of durability, and it is desired to improve the durability.

According to the present invention, it is desirable to provide the bending meshing type gear device having improved durability of the inner ring rolling surface of the wave generator bearing and the method of manufacturing the bending meshing type gear device.

Hereinafter, embodiments of the present invention will be described in detail with reference to the drawings.

Figure 1:
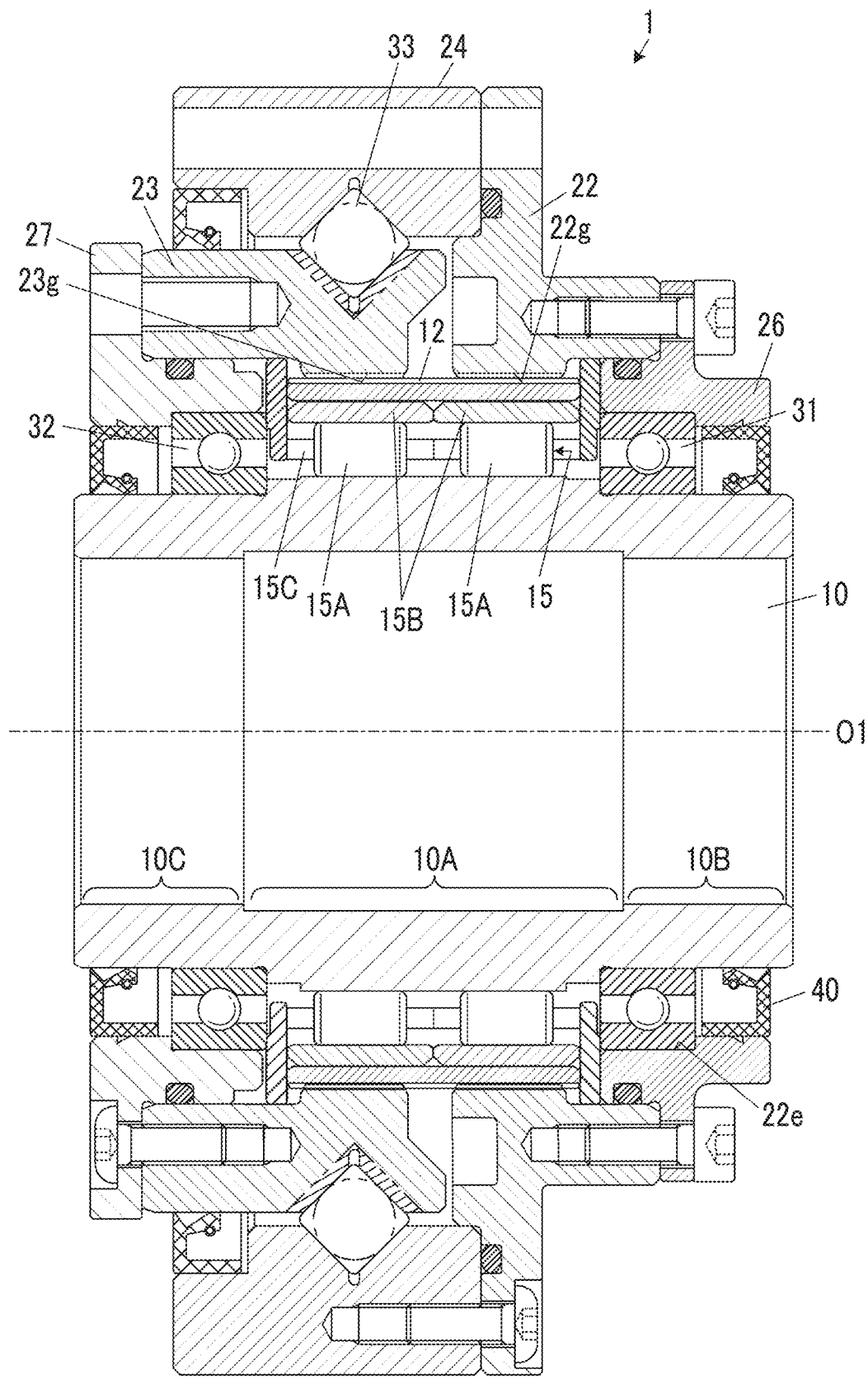
FIG. 1 is a cross-sectional view illustrating a bending meshing type gear device according to one embodiment of the present invention.

FIG. 1 is a cross-sectional view illustrating a bending meshing type gear device according to one embodiment of the present invention. Hereinafter, the direction along a rotation axis O1 of FIG. 1 is referred to as an axial direction, the direction perpendicular to the rotation axis O1 is referred to as a radial direction, and the rotation direction centered on the rotation axis O1 is referred to as a circumferential direction. Furthermore, in the axial direction, a side of a second cover 27 on which a decelerated rotating motion is output is referred to as an output side, and a side opposite thereto is referred to as a counter-output side.

A bending meshing type gear device 1 of FIG. 1 is a tubular bending meshing type gear device in which an external gear 12 is bent and deformed, and a rotating motion is decelerated and transmitted. The bending meshing type gear device 1 is provided with a wave generator shaft 10, the external gear 12 that is bent and deformed by the wave generator shaft 10, a counter-output side internal gear 22 and an output side internal gear 23 that mesh with the external gear 12, and a wave generator bearing 15. Furthermore, the bending meshing type gear device 1 is provided with a casing 24, a first cover 26, a second cover 27, input bearings 31 and 32, and a main bearing 33. The output side internal gear 23 corresponds to a first internal gear according to the present invention. The counter-output side internal gear 22 corresponds to a second internal gear according to the present invention.

The wave generator shaft 10 has a hollow shaft shape, and includes a wave generator 10A having an elliptical outer shape of a cross section perpendicular to the rotation axis (center axis) O1, and shaft portions 10B and 10C provided on both sides of the wave generator 10A in the axial direction and having a circular outer shape of a cross section perpendicular to the rotation axis O1. The elliptical shape is not limited to a geometrically exact ellipse, and includes a substantially elliptical shape. The wave generator shaft 10 rotates about the rotation axis O1, and the center of the outer shape in the cross section perpendicular to the rotation axis O1 of the wave generator 10A coincides with the rotation axis O1. The wave generator shaft 10 is an input shaft connected to a drive source (not illustrated) such as a motor and to which a driving force is input. In one embodiment, the outer peripheral surface of the wave generator 10A corresponds to the inner ring rolling surface on which a rolling element of the wave generator bearing 15 rolls.

The external gear 12 is a flexible cylindrical metal, and has teeth on the outer periphery.

The wave generator bearing 15 is disposed between the wave generator 10A and the external gear 12. The wave generator bearing 15 includes a plurality of rolling elements 15A, a holder 15C for holding the plurality of rolling elements 15A, and an outer ring 15B. The rolling element 15A is a roller, and may be a sphere. The plurality of rolling elements 15A includes a plurality of rolling elements 15A on the counter-output side located inward in the radial direction of one internal tooth portion 22g, and a plurality of rolling elements 15A on the output side located inward in the radial direction of the other internal tooth portion 23g. The plurality of rolling elements 15A roll with the outer peripheral surface of the wave generator 10A as the inner ring rolling surface and an inner peripheral surface of the outer ring 15B as an outer ring rolling surface. The rolling surface is also referred to as a trajectory surface.

The counter-output side internal gear 22 and the output side internal gear 23 include the internal tooth portions 22g and 23g in the circumferential portion, respectively. One internal tooth portion 22g meshes with the tooth portion on the counter-output side from the center in the axial direction of the external gear 12, and the other internal tooth portion 23g meshes with the tooth portion on the output side from the center in the axial direction of the external gear 12. The number of teeth of the counter-output side internal gear 22 and external gear 12 are different from each other, and the number of teeth of the output side internal gear 23 and external gear 12 coincide with each other. The one with the same number of teeth may be the counter-output side internal gear 22, and the one with a different number of teeth may be the output side internal gear 23.

The casing 24 is connected to the counter-output side internal gear 22, and covers the outer sides in the radial direction of the internal tooth portions 22g and 23g and the external gear 12 together with the counter-output side internal gear 22. The first cover 26 is connected to the output side internal gear 23, and covers the outer periphery portion of the wave generator shaft 10 on the counter-output side. The second cover 27 is connected to the counter-output side internal gear 22, and covers the outer periphery portion of the wave generator shaft 10 on the output side. The first cover 26 rotatably supports the wave generator shaft 10 via the input bearing 31. The second cover 27 rotatably supports the wave generator shaft 10 via the input bearing 32. The casing 24 rotatably supports the output side internal gear 23 via the main bearing 33.

Description of Operation

When the wave generator shaft 10 is rotationally driven by a drive source such as a motor, the motion of the wave generator 10A is transmitted to the external gear 12. In this case, the external gear 12 is regulated to a shape along the outer peripheral surface of the wave generator 10A, and is bent into an elliptical shape having a long shaft portion and a short shaft portion when viewed from the axial direction. Furthermore, the external gear 12 meshes with the fixed counter-output side internal gear 22 at the long shaft portion. Therefore, the external gear 12 does not rotate at the same rotation speed as the wave generator 10A, and the wave generator 10A rotates relatively inside the external gear 12. With this relative rotation, the external gear 12 is bent and deformed so that a long axis position and a short axis position move in the circumferential direction. The period of this deformation is proportional to the rotation period of the wave generator shaft 10.

When the external gear 12 is bent and deformed, the long axis position thereof moves, so that the position where the external gear 12 and the counter-output side internal gear 22 mesh with each other changes in the rotation direction. Here, for example, when it is assumed that the number of teeth of the external gear 12 is 100 and the number of teeth of the counter-output side internal gear 22 is 102, every time the meshing position revolves once, the meshing teeth of the external gear 12 and the counter-output side internal gear 22 are displaced, and thus the external gear 12 rotates. With the above number of teeth, the rotating motion of the wave generator shaft 10 is decelerated at a reduction ratio of 100:2 and is transmitted to the external gear 12.

On the other hand, since the external gear 12 meshes with the output side internal gear 23, the meshing position between the external gear 12 and the output side internal gear 23 also changes in the rotation direction due to the rotation of the wave generator shaft 10. Here, when assuming the number of teeth of the output side internal gear 23 and the number of teeth of the external gear 12 are the same as each other, the external gear 12 and the output side internal gear 23 do not rotate relatively, and the rotating motion of the external gear 12 is transmitted to the output side internal gear 23 at a reduction ratio of 1:1. As a result, the rotating motion of the wave generator shaft 10 is decelerated at a reduction ratio of 100:2, is transmitted to the output side internal gear 23 and the second cover 27, and is output to an external member as a drive target.

Details of Wave Generator Shaft

Figure 2A:
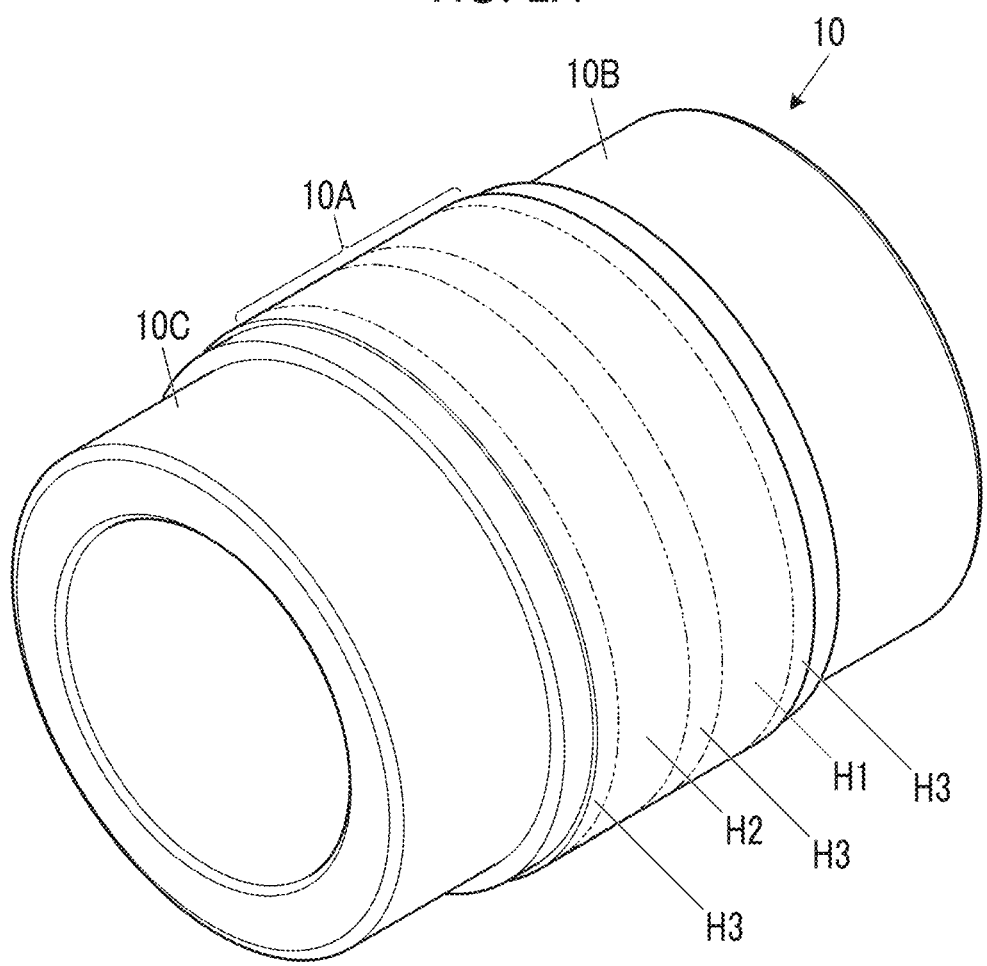
FIG. 2A is a perspective view illustrating a wave generator shaft of FIG. 1.
Figure 2B:
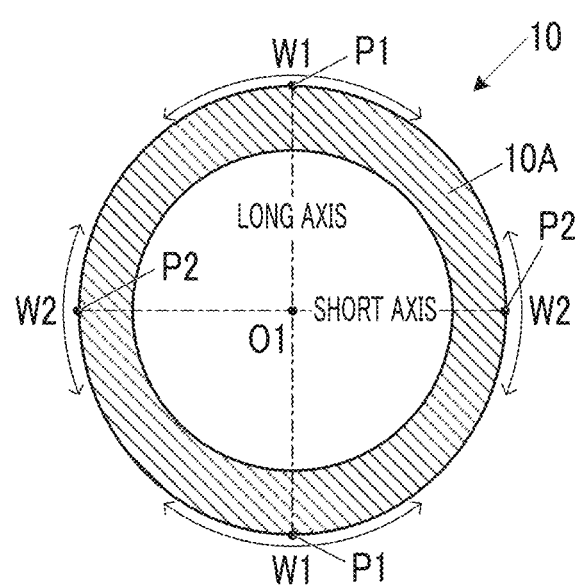
FIG. 2B is a view illustrating a cross section perpendicular to a rotation axis of a wave generator.

FIG. 2A is a perspective view illustrating a wave generator shaft, and FIG. 2B is a view illustrating a cross section perpendicular to a rotation axis of a wave generator. As described above, the outer peripheral surface of the wave generator 10A corresponds to the inner ring rolling surface on which the rolling element 15A of the wave generator bearing 15 rolls. The material of the wave generator shaft 10 is steel, and more specifically, iron (Fe) containing carbon (C): 0.18% to 0.23% by weight, silicon (Si): 0.15% to 0.35% by weight, manganese (Mn): 0.60% to 0.90% by weight, phosphorus (P): 0.030% by weight or less, sulfur (S): 0.030% by weight or less, nickel (Ni): 0.25% by weight or less, chromium (Cr): 0.90% to 1.20% by weight, and molybdenum (Mo): 0.15% to 0.25% by weight.

As illustrated in FIG. 2A, the outer peripheral surface of the wave generator 10A includes a rolling portion H1 on the counter-output side with which the rolling element 15A on the counter-output side comes into contact, a rolling portion H2 on the output side with which the rolling element 15A on the output side comes into contact, and a non-rolling portion H3 with which the rolling element 15A does not come into contact. In FIG. 2A, a boundary between each portion H1 to H3 is illustrated by a two-dot chain line. The non-rolling portion H3 is located at the central portion and both end portions in the axial direction of the inner ring rolling surface. Furthermore, as illustrated in FIG. 2B, the outer peripheral surface of the wave generator 10A includes a long axis range W1, which is a range around a long axis position P1 (for example, the range of ±70 degrees from the long axis position P1), and a short axis range W2, which is a range around a short axis position P2 (for example, the range of ±20 degrees from the short axis position P2), in the circumferential direction. The long axis position P1 is the maximum radius position on the elliptical outer periphery in the cross section obtained by cutting the wave generator 10A perpendicular to the rotation axis O1, and the short axis position P2 is the minimum radius position on the elliptical outer periphery in the same cross section. The rolling portion H1 is located inside the internal tooth portion 22g of the counter-output side internal gear 22 in the radial direction, and corresponds to the second portion in the present invention. The rolling portion H2 is located inside the internal tooth portion 23g of the output side internal gear 23 in the radial direction, and corresponds to the first portion in the present invention.

The outer peripheral surface (inner ring rolling surface) of the wave generator 10A has a different contact surface pressure with the rolling element 15A at each portion. As a matter of course, the rolling portions H1 and H2 have a higher contact surface pressure with the rolling element 15A than the non-rolling portion H3. The long axis range W1 has a higher contact surface pressure with the rolling element 15A than the short axis range W2, and the rolling portion H2 on the output side has a higher contact surface pressure with the rolling element 15A than the rolling portion H1 on the counter-output side. In addition, there may be a configuration in which the rolling portion H2 on the output side has a lower contact surface pressure with the rolling element 15A than the rolling portion H1 on the counter-output side.

Hardening Process

A hardening process is applied to the wave generator shaft 10 as a single component. The hardening process is a process of imparting a characteristic to the inner ring rolling surface that a hardness of the inner ring rolling surface when operating for a predetermined time is increased compared to a hardness of the inner ring rolling surface before operation. The above operation means that a load is applied to the (new) bending meshing type gear device 1 in which the wave generator shaft 10 is incorporated to cause a deceleration motion. The above hardening process is achieved by the following heat treatment.

Figure 3:
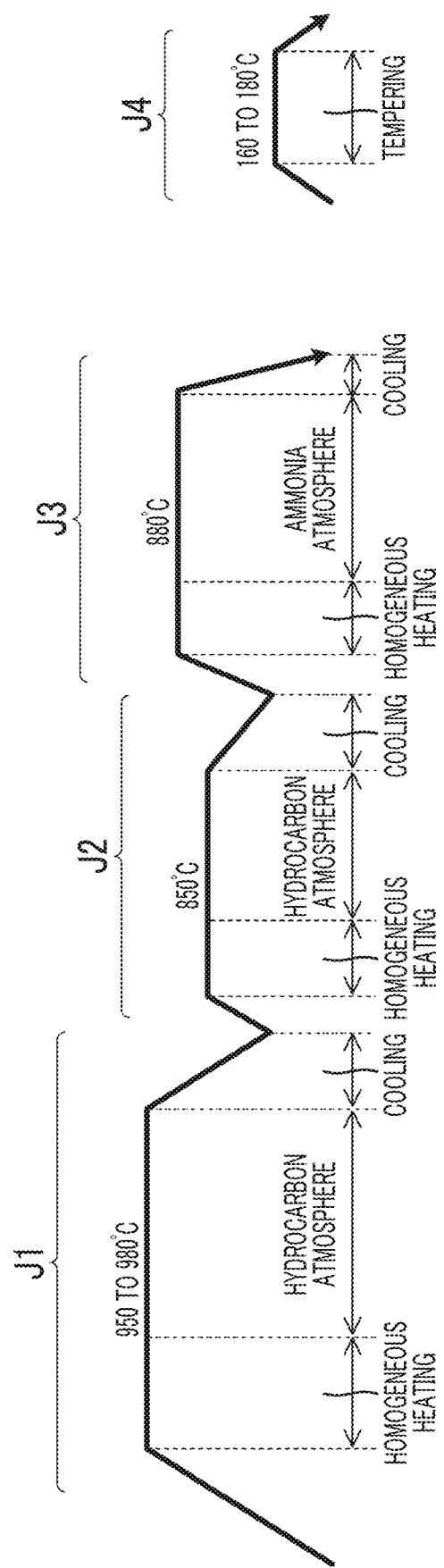
FIG. 3 is a time chart illustrating an example of a heat treatment for realizing a hardening process of the wave generator shaft.

FIG. 3 is a time chart illustrating an example of a heat treatment for realizing a hardening process of the wave generator shaft. In the heat treatment, first, the wave generator shaft 10 before the hardening process is heated to 950° C. to 980° C. in a furnace. When the wave generator shaft 10 is homogeneously heated to this temperature, the atmosphere in the furnace is switched to a hydrocarbon-based gas (for example, methane, propane, ethylene, acetylene, and the like) at that temperature, and this state is maintained. Thereafter, cooling is performed (first thermal step J1). Subsequently, the wave generator shaft 10 is heated to 850° C. in the furnace. When the wave generator shaft 10 is homogeneously heated to this temperature, the atmosphere in the furnace is switched to the hydrocarbon-based gas as described above at that temperature, and this state is maintained. Thereafter, cooling is performed (second thermal step J2). Next, the wave generator shaft 10 is heated to 880° C. in the furnace. When the wave generator shaft 10 is homogeneously heated to this temperature, the atmosphere in the furnace is switched to $NH_3$ gas at that temperature, and this state is maintained. Thereafter, the temperature is cooled faster to a temperature lower than that of the first thermal step J1 and the second thermal step J2 (third thermal step J3). Thereafter, tempering is performed at 160° C. to 180° C. for several hours (fourth thermal step J4) to complete the hardening process.

By raising the temperature of the first thermal step J1 to a high temperature, it is possible to obtain a hardening depth of a certain level or more in a short time. However, when the temperature is further raised above 980° C., adverse effects such as coarsening of crystal grains are likely to occur. Therefore, the temperature of the first thermal step J1 is set to 950° C. to 980° C. The hardening process that imparts the above-described characteristic is not limited to the above-described heat treatment.

Via the above heat treatment, carbon and nitrogen penetrate and diffuse into the surface portion of the wave generator shaft 10, and martensite transformed in the cooling process and untransformed residual austenite are distributed on the surface portion. The surface portion of the wave generator shaft 10 obtains the characteristics illustrated in the following characteristic table 1.

| Characteristic Table 1 | |
| --- | --- |
| Material characteristic | Value |
| ECD [mm] | 1.2-1.8 |
| Residual γ [% by volume] | 35-45 |
| Amount of carbides [% by area] | 5-15 |

Here, ECD is an effective hardened layer depth (Effective Case Depth), and in the present embodiment, ECD indicates, for example, a depth from the surface to a Vickers hardness of 550 HV. Residual γ indicates the volume ratio of residual austenite to the total volume. The amount of carbides indicates the area ratio of the precipitated carbide in the cross section of the surface portion.

By combining these characteristics of the surface portion, the characteristic is realized that the hardness of the outer peripheral surface (inner ring rolling surface) of the wave generator 10A when operating for a predetermined time is increased after operation compared to before operation. In general, on the inner ring rolling surface of any bearing on which the rolling element rolls, rolling fatigue occurs on the inner ring rolling surface due to repeated load fluctuations exerted by the rolling element. When the rolling fatigue reaches the fatigue life, damages such as flaking and pitting starting from the surface occur. It is considered that such damages are caused by a decrease in hardness on the metal surface. On the other hand, according to the outer peripheral surface of the wave generator 10A which has a characteristic in which the hardness is increased after operation for a predetermined time due to the hardening process, the hardness of the inner ring rolling surface of the wave generator bearing 15 is increased during the operation of the bending meshing type gear device 1. Therefore, damage such as flaking and pitting due to the decrease in hardness is suppressed, and the durability of the inner ring rolling surface of the wave generator bearing 15 under a severe condition in terms of durability is improved. The life of the bending meshing type gear device 1 can be extended.

The characteristic in which the hardness increases via the above-described operation for a predetermined time may be, for example, a characteristic in which the hardness of the inner ring rolling surface is increased compared to before operation when the rated load (maximum torque) is applied and the operation is performed at 10,000 rotations or more under the operating conditions of a rotation speed of 50% to 80% of the rated rotation speed (average is approximately 65% of the rated rotation speed). Due to this characteristic, the durability of the inner ring rolling surface of the wave generator bearing 15 which is in a severe condition in terms of durability is improved, and the life of the bending meshing type gear device 1 can be extended.

The characteristic in which the hardness is increased by the operation for a predetermined time may be preferably a characteristic in which a hardness is increased by 5% or more before and after operation of 10,000 rotations. In addition, the above characteristic may be more preferably a characteristic in which a hardness of ±3% or more of the hardness at 10,000 rotations is maintained from 20,000 rotations to 50,000 rotations under the above operating conditions. In addition, the above characteristic may be still more preferably a characteristic in which the hardness is gradually increased from 10,000 rotations to 50,000 rotations under the above operating conditions. Due to such characteristics, the life of the bending meshing type gear device 1 can be extended.

The characteristic in which the hardness is increased by the operation for a predetermined time is the characteristic in which the hardness is increased by the rolling element 15A rolling while applying a load to the outer peripheral surface (inner ring rolling surface) of the wave generator 10A. Therefore, the characteristic in which the hardness is increased by the operation for a predetermined time may be a characteristic that appears not in the entire outer peripheral surface of the wave generator 10A but only in a portion where the contact surface pressure of the rolling element 15A is high. That is, the characteristic may be a characteristic that appears in the rolling portion H2 on the output side where the contact surface pressure is increased, or in the long axis range W1 of the rolling portions H1 and H2. The entire angle range of the long axis range W1 may not have the characteristic in which the hardness is increased before and after operation, but a part of the angle range of the long axis range W1 may have the characteristic in which the hardness is increased before and after operation. Furthermore, the non-rolling portion H3 does not receive the contact surface pressure from the rolling element 15A, and the changes in hardness are small before and after operation.

Therefore, the characteristic in which the hardness is increased by the operation for a predetermined time may be rephrased as the characteristic in which the hardness of the rolling portions H1 and H2 is increased compared to the hardness of the non-rolling portion H3 when operating for a predetermined time.

Furthermore, a rate of increase in hardness is higher in the portion where the contact surface pressure of the rolling element 15A is increased. That is, the rolling portion H2 on the output side has a higher rate of increase in hardness before and after operation of the rolling portion H1 on the counter-output side, and the long axis range W1 has a higher rate of increase in hardness before and after operation than that of the short axis range W2.

Method of Confirming Characteristic of Increasing Hardness

Next, a method of confirming the characteristic in which the hardness is increased by the operation in the wave generator shaft 10 subjected to the above hardening process will be described. The characteristic of the outer peripheral surface of the wave generator 10A changes slightly each time a load is received from the rolling element 15A, and an increase in hardness can be easily identified when operating under the following conditions.

Operating condition 1: Apply the rated load (maximum torque) and operate 10,000 rotations continuously at a speed of 50% to 80% of the rated rotation speed (average is approximately 65% of the rated rotation speed).

Regarding the bending meshing type gear device 1 of one embodiment, when the wave generator shaft 10 was taken out and the hardness of each part of the wave generator 10A was measured at the time of shipment (new product) and after operation under the operating condition 1, the measurement results illustrated in the following table were obtained.

| Location | Long axis counter-output side | Short axis counter-output side | Long axis output side | Short axis output side | Non-rolling portion |
|---|---|---|---|---|---|
| [Measurement Results 1] | | | | | |
| Hardness before operation [HV/300 g] | 720 | 720 | 720 | 720 | 720 |
| Hardness after operation [HV/300 g] | 790 | 720 | 870 | 750 | 720 |

In the table, the "long axis counter-output side" indicates the rolling portion H1 in the long axis range W1 (refer to FIGS. 2A and 2B), and the "short axis counter-output side" indicates the rolling portion H1 in the short axis range W2. The "long axis output side" indicates the rolling portion H2 in the long axis range W1, and the "short axis output side" indicates the rolling portion H2 in the short axis range W2. "Non-rolling portion" indicates a non-rolling portion H3. "Hardness" indicates Vickers hardness with a test force of 300 gf (1 gf≈9.8 mN).

As illustrated in the measurement results 1, the hardness of the outer peripheral surface of the wave generator 10A is increased after operation compared to before operation at the rolling portions H1 and H2 that receive a load from the rolling element 15A. Furthermore, the rate of increase in hardness of the long axis range W1 having a high contact surface pressure with the rolling element 15A is higher than the rate of increase in hardness of the short axis range W2, and the rate of increase in hardness of the rolling portion H2 on the output side having a high contact surface pressure with the rolling element 15A is higher than the rate of increase in hardness of the rolling portion H1 on the counter-output side. Since the non-rolling portion H3 does not receive a load from the rolling element 15A via the operation, the hardness has little change and is equivalent to the hardness of the rolling portions H1 and H2 before operation.

As described above, according to the bending meshing type gear device 1 of one embodiment, the hardening process is applied to the inner ring rolling surface of the wave generator bearing 15, that is, the outer peripheral surface of the wave generator 10A. Furthermore, the hardening process is a process of imparting a characteristic to the inner ring rolling surface that the surface hardness after operating for a predetermined time is increased compared to the hardness before operation. In other words, the hardening process is a process of imparting the characteristic to the inner ring rolling surface that the surface hardness of the rolling portions H1 and H2 is increased compared to the surface hardness of the non-rolling portion H3 after operating fora predetermined time. Due to such a hardening process, the hardness of the outer peripheral surface of the wave generator 10A is increased in the process of operating the bending meshing type gear device 1, and damages such as flaking and pitting caused by a decrease in hardness can be suppressed. Therefore, the durability of the bending meshing type gear device 1 can be improved.

Furthermore, according to the bending meshing type gear device 1 of one embodiment, the portion of the outer peripheral surface of the wave generator 10A whose hardness is increased by the operation is included in the long axis range W1. The long axis range W1 receives a high contact surface pressure from the rolling element 15A as compared with other regions, and is in a severe condition in terms of durability. Therefore, the hardness of the portion is increased by the operation and the durability is improved, so that the durability of the bending meshing type gear device 1 can be further improved. It is not necessary that the hardness in the entire range of the long axis range W1 is increased after operation compared to before operation, and the hardness in a part of the long axis range W1 may be increased after operation compared to before operation. Preferably, the hardness of the long axis range W1 in a range that is in a severe situation in terms of durability may be increased, and the durability may be improved.

Furthermore, according to the bending meshing type gear device 1 of one embodiment, the portion of the outer peripheral surface of the wave generator 10A whose hardness is increased by the operation includes the rolling portion H2 on the output side. In the configuration of one embodiment, the rolling portion H2 on the output side receives a higher contact surface pressure from the rolling element 15A than the rolling portion H1 on the counter-output side, and is in a severe condition in terms of durability. Therefore, the hardness of the portion is increased by the operation and the durability is improved, so that the durability of the bending meshing type gear device 1 can be further improved. In a case where the rolling portion H1 on the counter-output side is configured to receive a higher contact surface pressure from the rolling element 15A than the rolling portion H2 on the output side, the portion whose hardness is increased by the operation may include the rolling portion H2 on the counter-output side.

Furthermore, according to the bending meshing type gear device 1 of one embodiment, the hardening process of the wave generator shaft 10 is a process of causing the residual austenite to be 35% to 45% by volume and the amount of carbides to be 5% to 15% by area on the outer peripheral surface of the wave generator 10A. Due to such phase transformation and composition of the surface portion, it is easy to realize the characteristic of the surface portion in which the hardness is increased by the operation, and the durability is improved.

Another Embodiment

Figure 4:
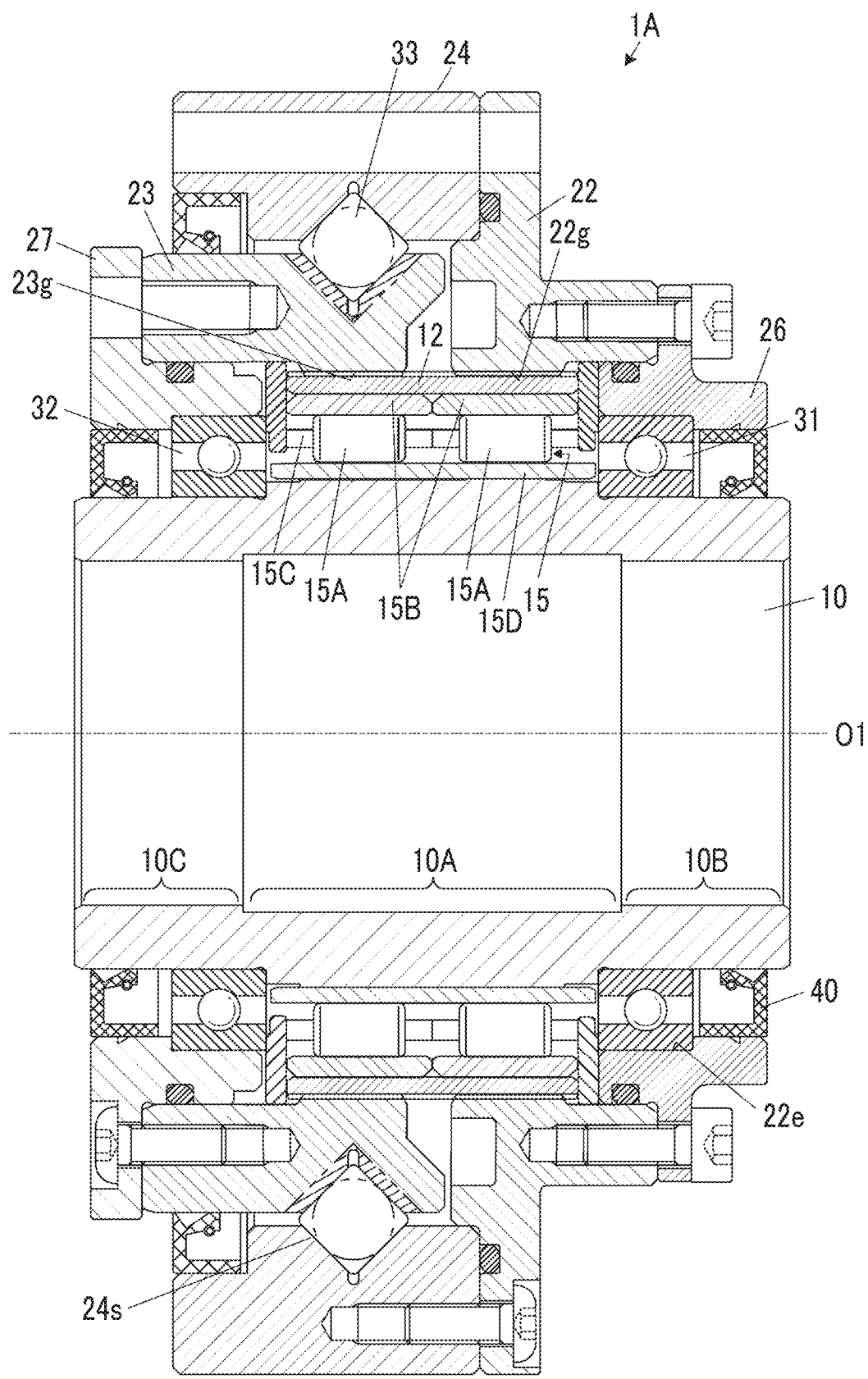
FIG. 4 is a cross-sectional view illustrating a bending meshing type gear device according to another embodiment of the present invention.

FIG. 4 is a cross-sectional view illustrating a bending meshing type gear device according to another embodiment of the present invention. A bending meshing type gear device 1A of another embodiment is different from one embodiment in that the wave generator bearing 15 has an inner ring 15D, and other components are the same as those of one embodiment. In another embodiment, the hardening process may or may not be applied to the wave generator shaft 10.

The inner ring 15D has an elliptical outer peripheral shape in a cross section perpendicular to the rotation axis (center axis) O1. Specifically, the inner ring 15D has a perfect circular shape in a state before being fitted onto the wave generator 10A, and has an elliptical shape when being fitted onto the wave generator 10A. The elliptical shape is not limited to a geometrically exact ellipse, and includes a substantially elliptical shape. The inner ring 15D is fitted onto the wave generator 10A of the wave generator shaft 10 and rotates with the wave generator 10A. The outer peripheral surface of the inner ring 15D is the inner ring rolling surface on which the rolling element 15A rolls. The outer peripheral surface of the inner ring 15D includes the rolling portion on the counter-output side with which the rolling element 15A is in contact, the rolling portion on the output side, and the non-rolling portion, similar to the outer peripheral surface of the wave generator 10A of one embodiment, and includes the long axis range and the short axis range also in the circumferential direction, similar to the outer peripheral surface of the wave generator 10A of one embodiment.

The material of the inner ring 15D is the same as the material of the wave generator bearing 15 of one embodiment.

The hardening process is applied to the inner ring 15D as a single component. The hardening process is the same as the hardening process applied to the wave generator bearing 15 of one embodiment. The characteristic, phase transformation and composition imparted to the inner ring 15D by the hardening process, and the hardness of each part after and before operation for a predetermined time are the same as those imparted to the outer peripheral surface of the wave generator 10A of one embodiment.

In the bending meshing type gear device 1A of another embodiment, the outer peripheral surface of the inner ring 15D of the wave generator bearing 15 receives a large load from the rolling element 15A and is in a severe condition in terms of durability. According to the bending meshing type gear device 1A of another embodiment, the hardness of the outer peripheral surface of the inner ring 15D is increased in the process of operating the bending meshing type gear device 1A, and damages such as flaking and pitting caused by a decrease in hardness can be suppressed. Therefore, the durability of the bending meshing type gear device 1A can be improved. In addition, the bending meshing type gear device 1A of another embodiment also has the same effect as that described in one embodiment. In the description of the effect of one embodiment, the effect of another embodiment is indicated by replacing the outer peripheral surface of the wave generator 10A with the outer peripheral surface of the inner ring 15D.

Hereinbefore, each embodiment of the present invention has been described. However, the present invention is not limited to the above embodiments. For example, the heat treatment to realize the hardening process as described in the embodiment is an example, and the invention is not limited thereto. Various heat treatments can be applied when a process of imparting a characteristic to the inner ring rolling surface that the surface hardness of the inner ring rolling surface after operating for a predetermined time is increased compared to the surface hardness of the inner ring rolling surface before operation, or a process of imparting a characteristic to the inner ring rolling surface that the surface hardness of the rolling portion of the inner ring rolling surface with which the rolling element is in contact is increased compared to the surface hardness of the non-rolling portion of the inner ring rolling surface with which the rolling element is not in contact after operating for a predetermined time can be realized. In addition, in the above embodiment, a so-called tubular type bending meshing type gear device is illustrated, but the present invention is not limited thereto. The present invention can also be applied to a so-called cup type, top hat type, and other bending meshing type gear devices. The present invention can also be regarded as a method of manufacturing a bending meshing type gear device having a hardening step of applying a hardening process to an inner ring rolling surface on which a rolling element of a wave generator bearing rolls. In addition, the details illustrated in the embodiments can be appropriately changed without departing from the scope of the invention.

It should be understood that the invention is not limited to the above-described embodiment, but may be modified into various forms on the basis of the spirit of the invention. Additionally, the modifications are included in the scope of the invention.

What is claimed is:

1. A bending meshing gear device comprising:
a wave generator;
an external gear that is bent and deformed by the wave generator;
an internal gear that meshes with the external gear; and
a wave generator bearing disposed between the wave generator and the external gear, wherein
an inner ring rolling surface on which a rolling element of the wave generator bearing rolls includes a hardened layer,
the hardened layer has a characteristic that a surface hardness after operating for a predetermined time is increased compared to a surface hardness before operation or has a characteristic that a surface hardness of a rolling portion of the inner ring rolling surface with which the rolling element is in contact is increased compared to a surface hardness of a non-rolling portion of the inner ring rolling surface with which the rolling element is not in contact after operating for a predetermined time,
the internal gear includes a first internal gear and a second internal gear,
a contact surface pressure of the inner ring rolling surface with the rolling element is higher in a first portion located inside the first internal gear in a radial direction than in a second portion located inside the second internal gear in the radial direction, and
a surface hardness after operating for the predetermined time is higher in the first portion than in the second portion.

2. The bending meshing gear device according to claim 1, wherein
the wave generator has a substantially elliptical outer shape of a cross section perpendicular to a rotation axis.

3. The bending meshing gear device according to claim 2, wherein
the inner ring rolling surface is an outer peripheral surface of the wave generator.

4. The bending meshing gear device according to claim 2, wherein
the wave generator bearing includes an inner ring, and
the inner ring is fitted onto the wave generator, rotates with the wave generator, has a substantially circular shape in a state before being fitted onto the wave generator, and has a substantially elliptical shape when being fitted onto the wave generator.

5. The bending meshing gear device according to claim 4, wherein
the inner ring rolling surface is an outer peripheral surface of the inner ring.

6. The bending meshing gear device according to claim 1, wherein
the rolling element is a roller or a sphere.

7. The bending meshing gear device according to claim 1, wherein the operation is performed about 10,000 rotations or more at a rotation speed of about 50% to 80% of a rated rotation speed while applying a rated load.

8. The bending meshing gear device according to claim 1, wherein the non-rolling portion is located at a central portion and both end portions in an axial direction of the inner ring rolling surface.

9. The bending meshing gear device according to claim 1, wherein
the inner ring rolling surface includes a long axis position and a short axis position in a cross-sectional outer shape perpendicular to a center axis, and
a portion where a surface hardness is increased after operating for the predetermined time is included in a range of about ±70 degrees from the long axis position of the inner ring rolling surface.

10. The bending meshing gear device according to claim 9, wherein
in a case where a range of about ±70 degrees from the long axis position of the inner ring rolling surface is defined as a long axis range and a range of about ±20 degrees from the short axis position is defined as a short axis range, a contact surface pressure of the inner ring rolling surface with the rolling element is higher in the long axis range than in the short axis range.

11. The bending meshing gear device according to claim 1, wherein
the rolling element includes a plurality of rolling elements located inside the first internal gear in the radial direction and a plurality of rolling elements located inside the second internal gear in the radial direction.

12. The bending meshing gear device according to claim 1, wherein the hardened layer has about 35% to 45% by volume of residual austenite and about 5% to 15% by area of amount of carbides before operation.

13. A method of manufacturing a bending meshing gear device that includes a wave generator, an external gear that is bent and deformed by the wave generator, an internal gear that meshes with the external gear, and a wave generator bearing disposed between the wave generator and the external gear, in which an inner ring rolling surface on which a rolling element of the wave generator bearing rolls includes a hardened layer, and the hardened layer has a characteristic that a surface hardness after operating for a predetermined time is increased compared to a surface hardness before operation, the method comprising:

a hardening step of applying a hardening process to the inner ring rolling surface on which the rolling element of the wave generator bearing rolls, wherein in the hardening step, a process is performed of imparting a characteristic to the inner ring rolling surface that a surface hardness of the inner ring rolling surface after the bending meshing gear device is operated for a predetermined time is increased compared to a surface hardness of the inner ring rolling surface before operation.

14. The method according to claim 13, wherein the hardening step is heat treatment including a first thermal step of heating a wave generator shaft provided with the wave generator to about 950° C. to 980° C. in a furnace, switching an atmosphere in the furnace to a hydrocarbon-based gas at the above temperature when the wave generator shaft is homogeneously heated at the above temperature, maintaining this state, and then performing cooling, a second thermal step of heating the wave generator shaft to about 850° C. in the furnace, switching the atmosphere in the furnace to the hydrocarbon-based gas at the above temperature when the wave generator shaft is homogeneously heated at the above temperature, maintaining this state, and then performing cooling, a third thermal step of heating the wave generator shaft to about 880° C. in the furnace, switching the atmosphere in the furnace to NH3 gas at the above temperature when the wave generator shaft is homogeneously heated at the above temperature, maintaining this state, and then cooling the temperature faster to a temperature lower than the temperatures of the first thermal step and the second thermal step, and a fourth thermal step of performing tempering on the wave generator shaft at about 160° C. to 180° C. for a predetermined time.

15. The method according to claim 14, wherein the hydrocarbon-based gas is methane, propane, ethylene, or acetylene.

16. A method of manufacturing a bending meshing gear device that includes a wave generator, an external gear that is bent and deformed by the wave generator, an internal gear that meshes with the external gear, and a wave generator bearing disposed between the wave generator and the external gear, in which an inner ring rolling surface on which a rolling element of the wave generator bearing rolls includes a hardened layer, and the hardened layer has a characteristic that a surface hardness of a rolling portion of the inner ring rolling surface with which the rolling element is in contact is increased compared to a surface hardness of a non-rolling portion of the inner ring rolling surface with which the rolling element is not in contact after operating for a predetermined time, the method comprising:

a hardening step of applying a hardening process to the inner ring rolling surface on which the rolling element of the wave generator bearing rolls, wherein in the hardening step, a process is performed of imparting a characteristic to the inner ring rolling surface that the surface hardness of the rolling portion of the inner ring rolling surface with which the rolling element is in contact is increased compared to the surface hardness of the non-rolling portion of the inner ring rolling surface with which the rolling element is not in contact after the bending meshing gear device is operated for a predetermined time.

\* \* \* \* \*